(12) United States Patent
Casper et al.

(10) Patent No.: US 12,180,007 B2
(45) Date of Patent: Dec. 31, 2024

(54) MODULAR CHUTE SYSTEM

(71) Applicant: TALOS ENGINEERED PRODUCTS, LLC, Franklin, TN (US)

(72) Inventors: Zachary Casper, Franklin, TN (US);
Jathan Richard, Franklin, TN (US);
Dewayne Sullivan, Franklin, TN (US);
Matt Harvey, Franklin, TN (US);
Ivanhoe Chaput, Franklin, TN (US)

(73) Assignee: TALOS ENGINEERED PRODUCTS, LLC, Franklin, TN (US)

( * ) Notice: Subject to any disclaimer, the term of this patent is extended or adjusted under 35 U.S.C. 154(b) by 20 days.

(21) Appl. No.: 18/121,792

(22) Filed: Mar. 15, 2023

(65) Prior Publication Data

US 2023/0294921 A1 Sep. 21, 2023

Related U.S. Application Data

(60) Provisional application No. 63/319,807, filed on Mar. 15, 2022.

(51) Int. Cl.
| | |
|---|---|
| *B65G 11/06* | (2006.01) |
| *B65G 11/16* | (2006.01) |
| *B65G 11/18* | (2006.01) |
| *B65G 21/08* | (2006.01) |

(52) U.S. Cl.
CPC .......... *B65G 11/063* (2013.01); *B65G 11/163* (2013.01); *B65G 11/183* (2013.01); *B65G 21/08* (2013.01)

(58) Field of Classification Search
CPC ... B65G 11/063; B65G 11/066; B65G 11/163; B65G 11/166; B65G 11/183; B65G 11/186; B65G 21/08; B65G 2207/30
USPC ............................................ 198/560; 193/12
See application file for complete search history.

(56) References Cited

U.S. PATENT DOCUMENTS

| | | | |
|---|---|---|---|
| 801,252 A | 10/1905 | Koller | |
| 1,256,724 A * | 2/1918 | Pardee ................. | B65G 11/066 |
| | | | 193/12 |
| 1,270,366 A * | 6/1918 | Bend .................... | B65G 11/063 |
| | | | 193/12 |
| 1,722,675 A | 7/1929 | Pardee et al. | |
| 2,204,828 A | 6/1940 | Sherrill | |

(Continued)

FOREIGN PATENT DOCUMENTS

EP 3689795 8/2020

*Primary Examiner* — Mark A Deuble
(74) *Attorney, Agent, or Firm* — ALLEN, DYER ET AL.

(57) ABSTRACT

A modular chute system includes a support bridge having a main body and a plurality of mounting plates spaced apart along the main body. The support bridge has a first end configured to be secured to an infeed component and a second end configured to be secured to a discharge component. The system includes a plurality of ribs, each having an outer portion and an inner portion, where the plurality of ribs is secured to the plurality of mounting plates. The system also includes an inner lining secured across the inner portion of the plurality of ribs, and a plurality of panels each having a mounting bracket on a proximal end secured between the outer portion of adjacent ribs using the mounting bracket. A distal end of each panel is secured through a respective anchor slot to form a continuous sliding surface from the infeed component to the discharge component.

20 Claims, 8 Drawing Sheets

(56) References Cited

U.S. PATENT DOCUMENTS

| | | | |
|---|---|---|---|
| 2,437,259 A * | 3/1948 | Kautz | B21C 37/26 |
| | | | 29/889 |
| 2,708,995 A | 5/1955 | Saliba | |
| 3,064,783 A | 11/1962 | McClelland, Jr. | |
| 3,083,015 A * | 3/1963 | Barenholtz | A63G 21/00 |
| | | | 193/12 |
| 3,136,401 A | 6/1964 | Atanasoff et al. | |
| 4,403,686 A | 9/1983 | Rycenga | |
| 5,220,986 A | 6/1993 | Winkler, III | |
| 5,598,914 A * | 2/1997 | Sulzer | B65G 11/203 |
| | | | 193/34 |
| 8,733,529 B2 | 5/2014 | Heddles et al. | |
| 8,757,347 B2 | 6/2014 | Heitplatz | |
| 9,415,936 B1 * | 8/2016 | Rodriguez | B65G 11/163 |
| 9,969,554 B2 | 5/2018 | Hartmann et al. | |
| D846,222 S * | 4/2019 | Rodriguez | B65G 11/063 |
| | | | D34/28 |
| 10,766,702 B2 * | 9/2020 | Casper | B65G 11/06 |
| 11,155,413 B2 * | 10/2021 | Stock | B65G 11/183 |
| 11,203,489 B2 * | 12/2021 | Casper | B65G 11/183 |
| 2003/0194300 A1 | 10/2003 | Lhoest | |
| 2014/0039669 A1 | 2/2014 | Lykkegaard et al. | |
| 2022/0212872 A1 | 7/2022 | Wargo | |

\* cited by examiner

MODULAR CHUTE SYSTEM

RELATED APPLICATIONS

The present invention is related to U.S. Provisional Patent Application Ser. No. 63/319,807 filed Mar. 15, 2022, the entire contents of which are incorporated herein by reference.

FIELD

The present invention relates to the field of package handling facilities, and, more particularly, to a modular chute system.

BACKGROUND

Chutes are well-known devices for the transport of articles within package handling facilities. Commonly, articles in the chute move from an upper location to a lower location by sliding down the chute via the force of gravity. Some chutes may also provide for mechanical or human assistance in applying the necessary force to transport articles down the chute.

Chutes known to the art are commonly constructed of metal, fiberglass, wood, polymer, or any combination thereof. However, chutes known to the art suffer a number of disadvantages. Fiberglass and polymer chutes often must be created from molds. Such molds are expensive and can only be used to create exact duplicates of the mold. Additionally, molds cannot be readily adapted to accommodate desired changes in the chute structure.

Metal chutes are typically constructed from steel components that must be prefabricated by welding each component together. When a component fails or is damaged, repairs are expensive and time consuming. Repairs commonly require cutting or removal of one or more of the components. In many cases, the entire chute must be removed to make repairs. The chute must also be re-welded after repairs are finished. While metal chutes may often accommodate heavier articles, such chutes are often heavy and, therefore, expensive and difficult to install, remove, or modify in any manner. Further, prefabricated metal chutes are difficult and expensive to ship to a desired location.

It would be advantageous for an improved chute to be readily assembled and disassembled for timely and cost-efficient transportation and installation of the chute. It would also be advantageous for the chute to be readily repairable and to accommodate easy replacement of any portion or component of the chute. Further, it would be advantageous for an improved chute to be readily adaptable to a desired size, slope, and rotational degree.

SUMMARY

In view of the foregoing background, it is therefore an object of the present invention to provide a modular chute system.

In a particular aspect, a modular chute system is disclosed. The system includes a support bridge having a main body and a plurality of mounting plates spaced apart along the main body. The support bridge has a first end configured to be secured to an infeed component and a second end configured to be secured to a discharge component. The system also includes a plurality of ribs, each having an outer portion and an inner portion, where the plurality of ribs is secured to the plurality of mounting plates. In addition, the system includes an inner lining secured across the inner portion of the plurality of ribs, and a plurality of panels each having a mounting bracket on a proximal end secured between the outer portion of adjacent ribs using the mounting bracket. A distal end of each of the panels is secured through a respective anchor slot of the inner lining to form a continuous sliding surface from the infeed component to the discharge component.

The main body of the support bridge may comprise a tube such as a steel pipe. In addition, the main body may have a plurality of weldment alignment indicators along its length and correspond to locations where the plurality of mounting plates is secured to the main body. The plurality of mounting plates may also comprise a correlating weldment alignment indicator to align with a respective weldment indicator of the main body.

The plurality of panels may have an inlet panel of particular dimensions, a transition panel of different dimensions, and common panels with yet further different dimensions. The plurality of ribs may also have an inlet rib of particular dimensions, a transition rib of different dimensions, an outlet rib of further different dimensions, and at least one common rib with yet further different dimensions.

A centerline of the continuous sliding surface from the infeed component to the discharge component is curvilinear and the plurality of panels may comprise ultra-high molecular weight polyethylene (UHMW). In addition, each of the plurality of panels may have a trapezoidal shape. The distal end of each of the plurality of panels may include a tab for securing through a respective anchor slot.

In another particular aspect, a method of making a modular chute is disclosed. The method includes providing a support bridge having a main body, and securing a plurality of mounting plates along the main body, where the support bridge has a first end secured to an infeed component and a second end secured to a discharge component. The method also includes securing a plurality of ribs to the plurality of mounting plates, and securing an inner lining across an inner portion of the plurality of ribs, where the inner lining has a plurality of anchor slots. In addition the method includes securing proximal ends of a plurality of panels between an outer portion of adjacent ribs using a mounting bracket, and securing distal ends of the plurality of panels through a respective anchor slot in the inner lining to form a continuous sliding surface of the plurality of panels from the infeed component to the discharge component.

BRIEF DESCRIPTION OF THE DRAWINGS

The aspects and the attendant advantages of the embodiments described herein will become more readily apparent by reference to the following detailed description when taken in conjunction with the accompanying drawings wherein.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
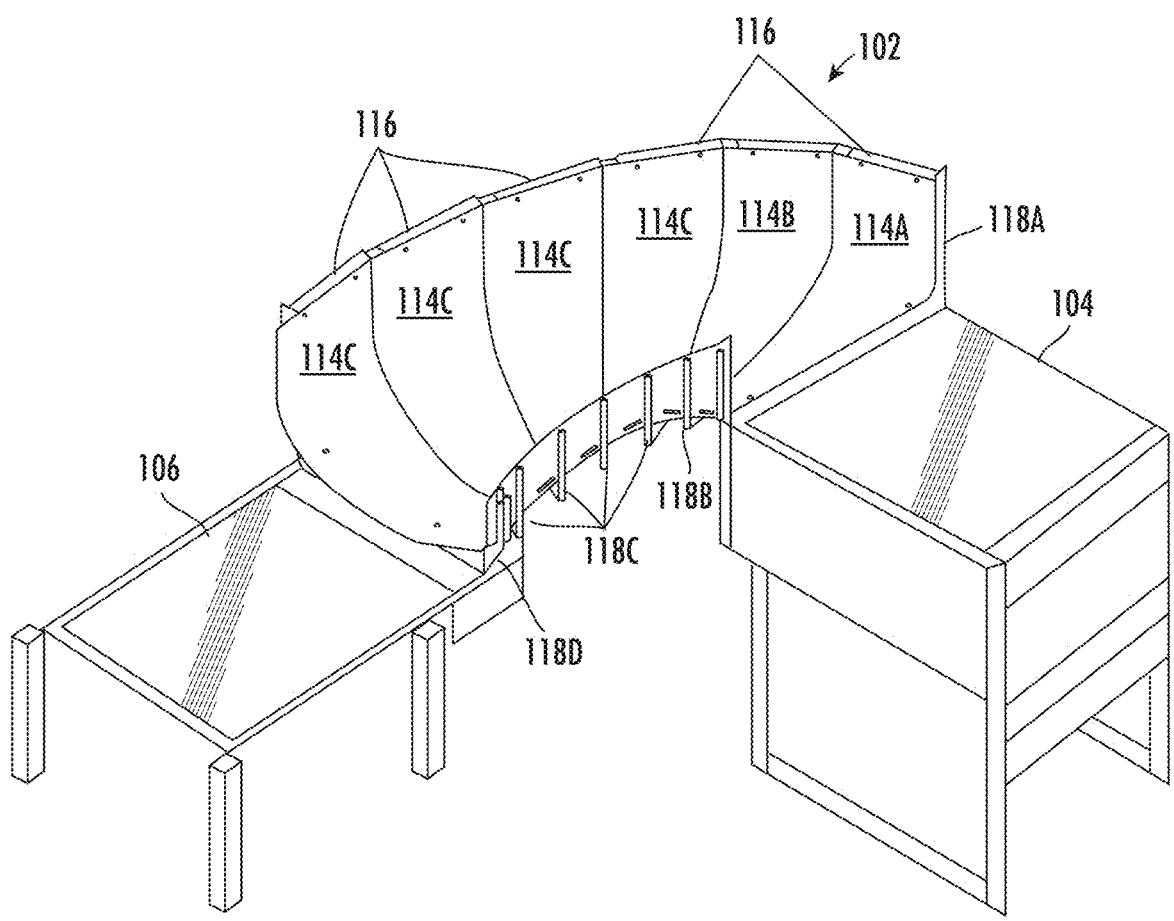
FIG. 1 is a perspective view of a modular chute system in which various aspects of the disclosure may be implemented.

Referring now to FIG. 1, a modular chute system is disclosed and generally designated 102. An infeed component 104 is positioned adjacent to a first end of the modular chute system 102 (or hereinafter referred to as "chute") and a discharge component 106 is positioned at a second downstream end of the chute 102.

The infeed component 104 is used to feed articles into the first end, or top end, of the chute 102. The discharge component 106 may include a conveying surface, table, or bin, which is the desired discharge location for articles exiting the second end, or bottom end, of the chute 102. As can be appreciated by those of ordinary skill in the art, the infeed component 104 may be removably coupled to the first end of the chute 102 by any suitable mechanical means, such as by screws, rivets, bolts, nuts, brackets, straps, or any combination thereof. Likewise, the discharge component 106 may be removably coupled to the bottom end of the chute 102 by any such suitable mechanical means. When assembled, the chute 102 is structurally supported by both the infeed component 104 and the discharge component 106.

The modular chute 102 includes a plurality of panels 114A, 114B, 114C that form a continuous sliding surface for packages to slide down using gravity. A centerline of the continuous sliding surface from the infeed component 104 to the discharge component may be curvilinear 106.

The panels 114A-114C are supported by a plurality of ribs 118A, 118B, 118C, 118D. In addition, an inner lining 120 is secured to an inner portion of the plurality of ribs 118A-118D. The inner lining 120 is generally a vertical surface configured to keep packages from being ejected from the chute 102. A distal end of each of the panels 114A-114C is secured to the inner lining 120 as described in more detail below. The panels 114A-114C also include a mounting bracket 116 that is used to secure a proximal end of each panel 114A-114C to an outer portion of the plurality of ribs 118A-118D. The inner wall 120 guides the objects that are sliding down the chute 102 as well as providing support for one end of the panels.

Figure 2:
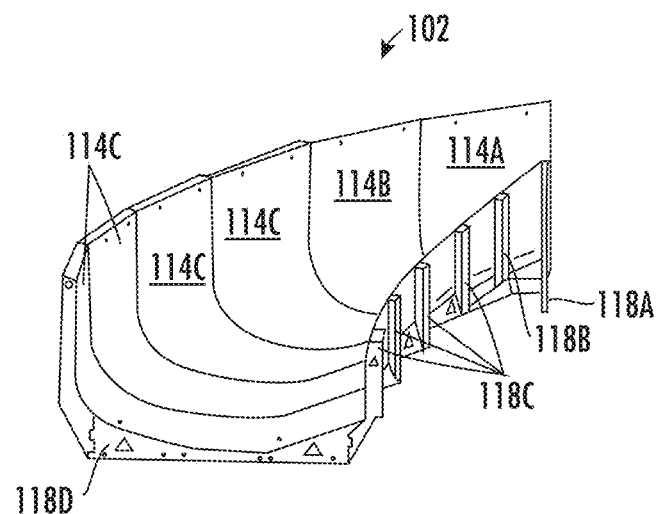
FIG. 2 is a front perspective view of the modular chute system of FIG. 1.
Figure 3:
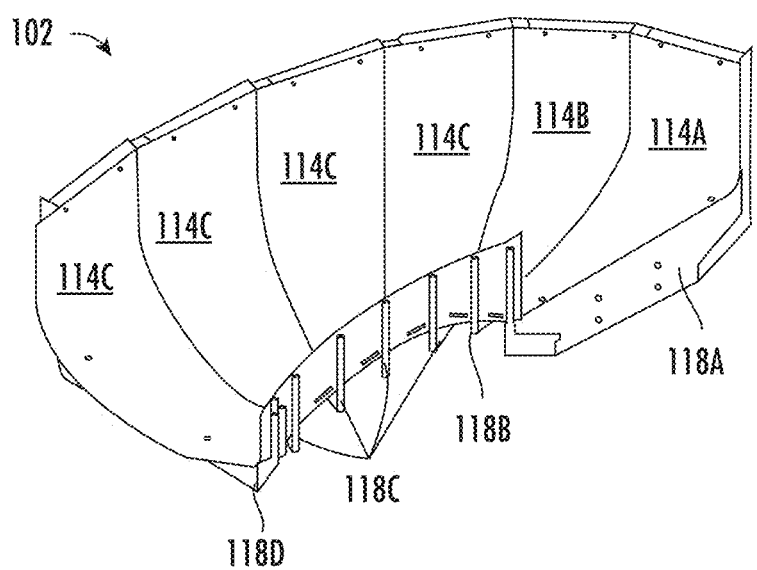
FIG. 3 is a right side perspective view of the modular chute system of FIG. 1.

The infeed component 104 and the discharge component 106 have been removed from the remaining figures for clarity. The panel 114A at the top of the chute 102 overlaps with the adjacent panel 114B, which overlaps with panel 114C to the bottom end of the chute 102 as shown in FIGS. 2 and 3. The rib 118A at the top of the chute 102 is configured to be secured to the infeed component 104. The adjacent rib 118B is a transition rib between the rib 118A and the standard ribs 118C. The rib 118D at the bottom of the chute 102 is configured to be secured to the discharge component.

Figure 4:
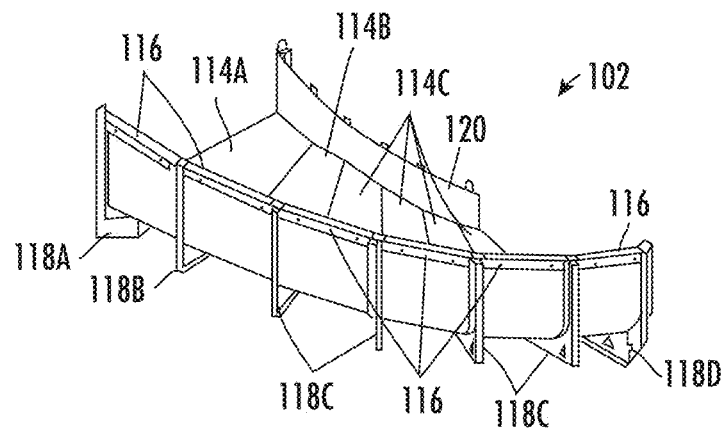
FIG. 4 is a left side perspective view of the modular chute system of FIG. 1.
Figure 5:
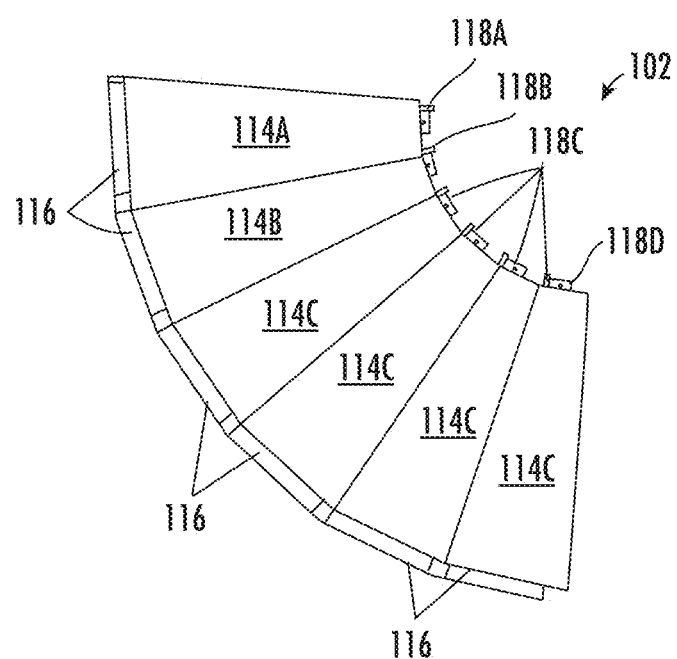
FIG. 5 is a top view of the modular chute system of FIG. 1.

The ribs 118A-118D are positioned and spaced apart in a curvilinear or spiral pattern as shown in FIGS. 4 and 5. The ribs 118A-118D may also be stepped down vertically to a lower elevation from each adjacent rib to create the desired slope on the chute 102. The plurality of panels 114A-114C have their proximal ends secured to the outer portions of the ribs 118A-118D using mounting brackets 116. Each of the panels 114A-114C has a width that accommodates a width between respective and adjacent ribs 118A-118D so that the respective mounting bracket 116 can be secured thereto.

Figure 6:
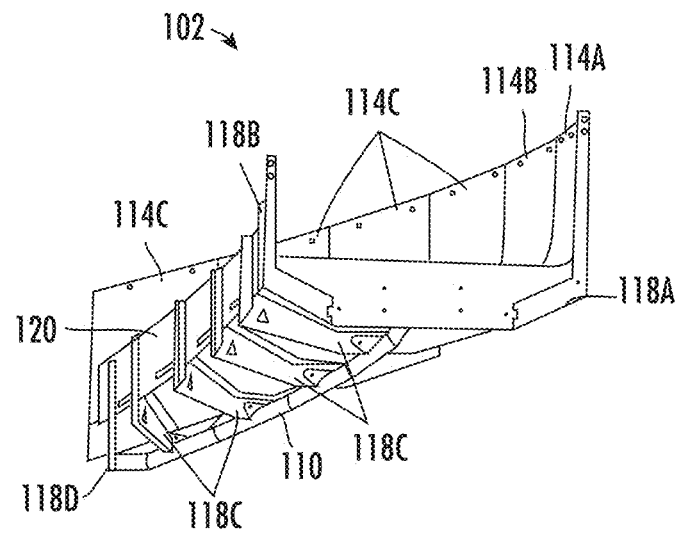
FIG. 6 is a rear perspective view of the modular chute system of FIG. 1.
Figure 7:
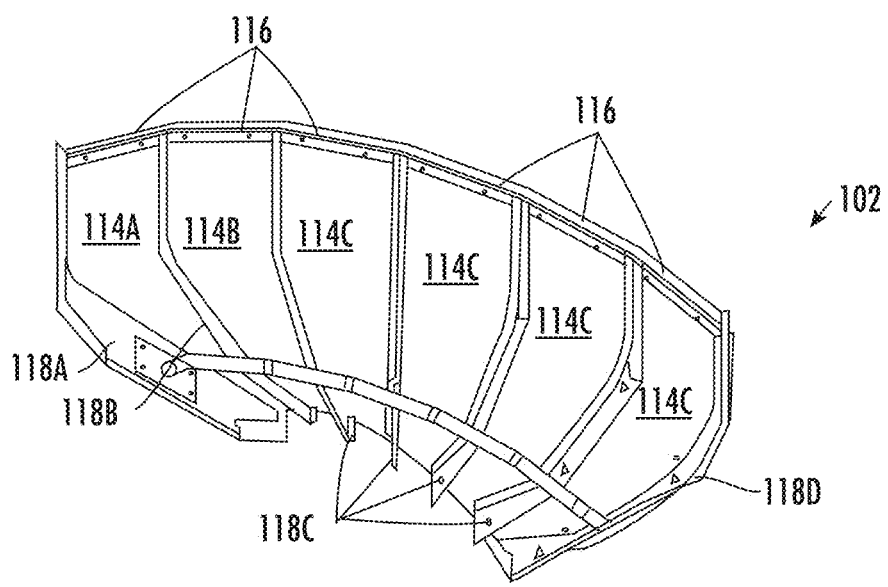
FIG. 7 is a bottom left side perspective view of the modular chute system of FIG. 1.

Referring now to FIGS. 6 and 7, the components that provide the structure for the sliding surface of the chute 102 are visible. In particular, the support bridge includes a main body 110 that is connected to the plurality of ribs 118A-118D along the length of the chute 102 and mounting plates 112.

Figure 8:
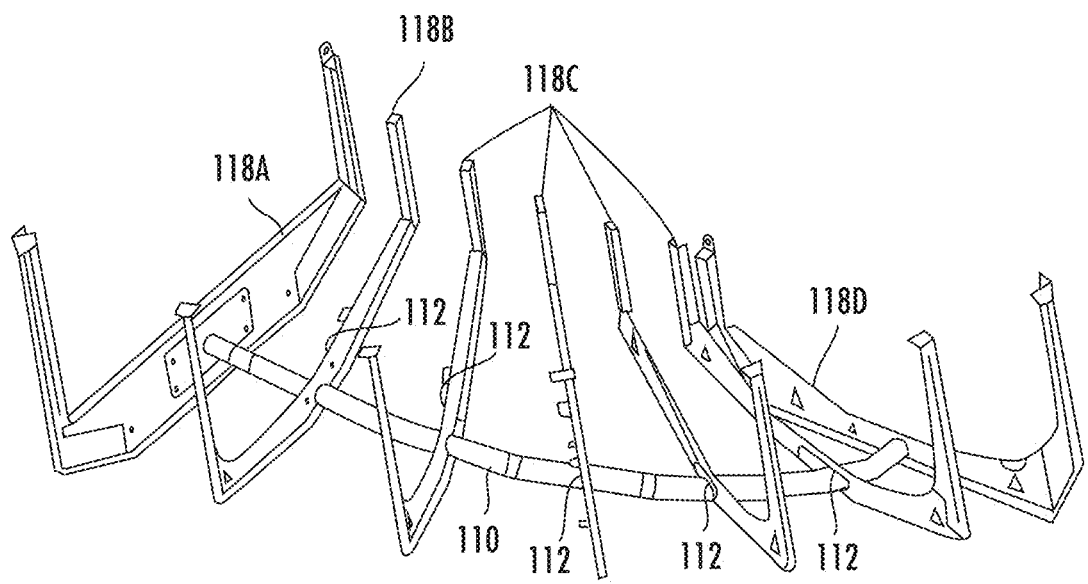
FIG. 8 is a perspective view of a support structure for the modular chute system.

The main body 110 is positioned along the approximate centerline of the chute 102 and comprise a tube such as a two inch formed steel pipe, laser cut and processed through a tube bender as shown in in FIG. 8. In another aspect, the main body 110 may be fabricated using joint welded construction. As those of ordinary skill in the art can appreciate, the main body 110 may be different dimensions, shapes, lengths, and materials, and fabricated using different methods.

Figure 9:
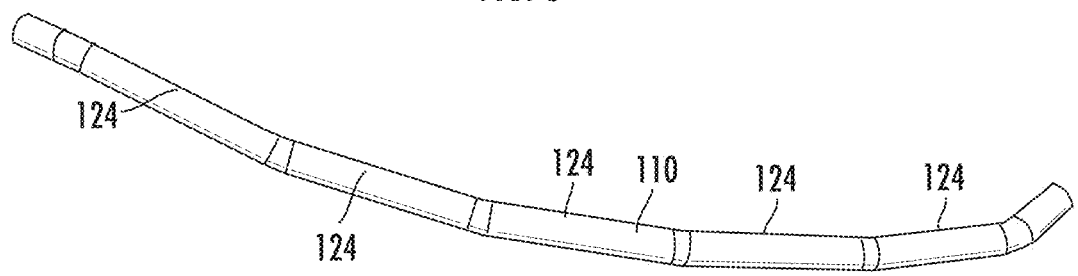
FIG. 9 is a perspective view of a support bridge of the modular chute system.
Figure 10:
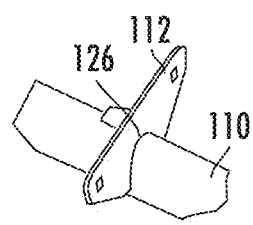
FIG. 10 is a perspective view of a mounting plate configured to secure a rib to the support bridge of the modular chute system.

The main body 110 includes a plurality of weldment alignment indicators 124 along its length as shown in in FIG. 9 and correspond to locations where the plurality of mounting plates 112 are to be secured to the main body 110. Similarly, the plurality of mounting plates each comprise a correlating weldment alignment indicator 126 to align with a respective weldment indicator 124 of the main body 110 to assist a welder in positioning the mounting plates 112 at the correct location as shown in FIG. 10.

Figure 11:
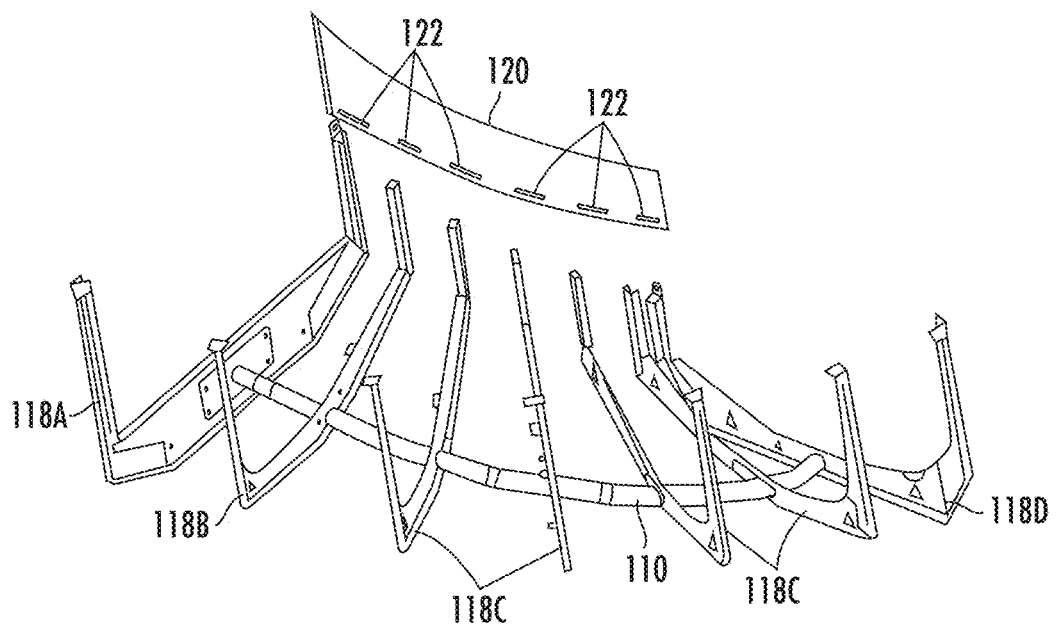
FIG. 11 is a perspective view of the support system and an inner lining of the modular chute system.
Figure 12:
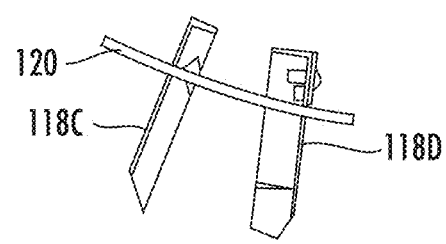
FIG. 12 is a detail view of the inner lining secured to the ribs of the modular chute system.

The inner lining 120 is shown in FIG. 11 having a plurality of anchor slots 122. The anchor slots 122 are configured to receive a distal end of the plurality of panels 114A-114C therethrough. Accordingly, the distal ends of the respective panels are held in place while the panels 114A-114C are being secured to ribs 118A-118D making assembly more efficient. The inner lining 120 is secured to the inner portions of the ribs 118A-118D as shown in FIG. 12.

Figure 13:
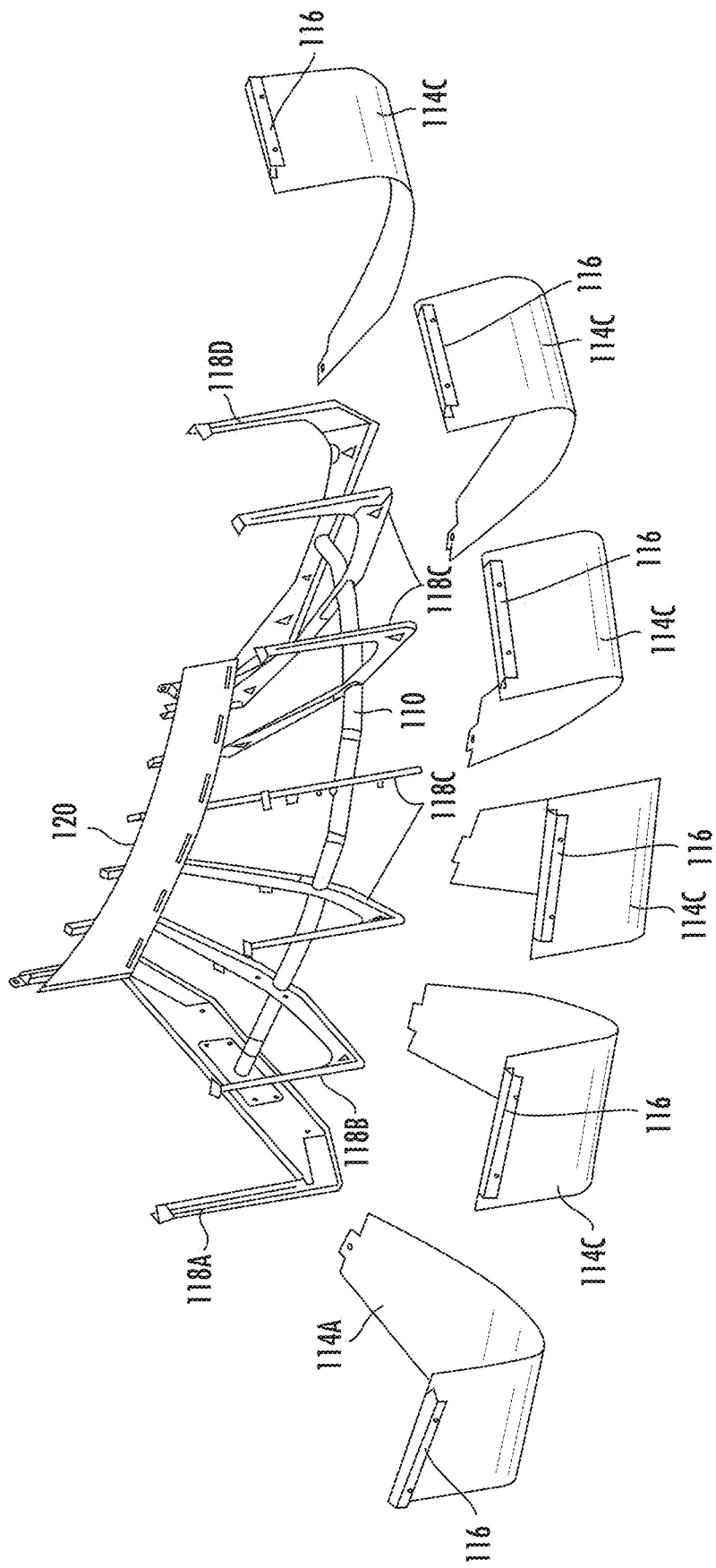
FIG. 13 is an exploded view of the modular chute system.

Referring now to FIG. 13, the plurality of panels 114A-114C may not be identical. In particular, the plurality of panels may comprise an inlet panel 114A, a transition panel 114B, and at least one common panel 114C, with each having different dimensions. The plurality of ribs 118A-118D may also not be identical. Instead, the plurality of ribs may comprise an inlet rib 118A, a transition rib 118B, an outlet rib 118D, and at least one common rib 118C, with each having different dimensions.

The exploded view of the chute 102 shown in FIG. 13 also illustrates the assembly process. The ribs 118A-118D, inner wall 120, panels 114A-114C, and main body 110 of the support bridge can be shipped disassembled from each other and assembled onsite. The mounting plates 112 are pre-positioned in the desired location for the proper slope on the main body 110 to make assembly of the ribs 118A-118D quick and easy. The inner wall 120 is secured to the ribs on the inner portion of the chute 102. As explained above, each of the panels 114A-114C have a mounting bracket 116 that is secured between two adjacent ribs. The opposing distal end of the panel is slipped through the respective anchor slot 122 of the inner wall 120 and secured. As can be appreciated by one of ordinary skill in the art, the different elements of the chute 102 may be assembled by any suitable mechanical means, such as by screws, rivets, bolts, nuts, brackets, straps, or any combination thereof.

In a particular aspect, the different elements of the chute 102 may comprise ultra-high molecular weight (UHMW) polyethylene. The UHMW polyethylene may comprise DuraSurf™ Silicon Treated Surface, Tivar® 1000 ESD, Tivar® Dry Slide, SIMONA® Low Friction PE, or King Hy-Pact®. In another aspect, the elements may comprise such suitable materials as other selected polymers or plastics, wood, fiberglass, or metals such as steel or aluminum.

In use, the modular chute system 102 is readily adaptable for the transportation of a variety of sizes and shapes articles. The chute 102 may be used to transport such articles from a first location to a desired second location, wherein the first location is positioned at a height above the desired second location at the infeed component 104. The speed with which the articles are transported may vary by altering the slope of the chute. The chute 102 is readily assembled and disassembled for timely and cost-efficient shipping and installation of the chute 102. As such, in use, the entire chute 102 may be transported and shipped completely disassembled. The complete chute 102 may then be readily assembled at the desired destination in any number of sizes and configurations.

The chute 102 is readily modifiable to any number of selected sizes and shapes by adding, removing, or adjusting components, as described herein, such as ribs, panels, and the main body 110 of the support bridge. Additionally, the chute 102 is readily repairable and can accommodate easy replacement of any portion of the chute 102, such as the ribs and panels. Further, in use, the modular chute 102 is readily adaptable to a desired overall size and readily configured to any desired shape and rotational degree, as described herein.

Figure 14:
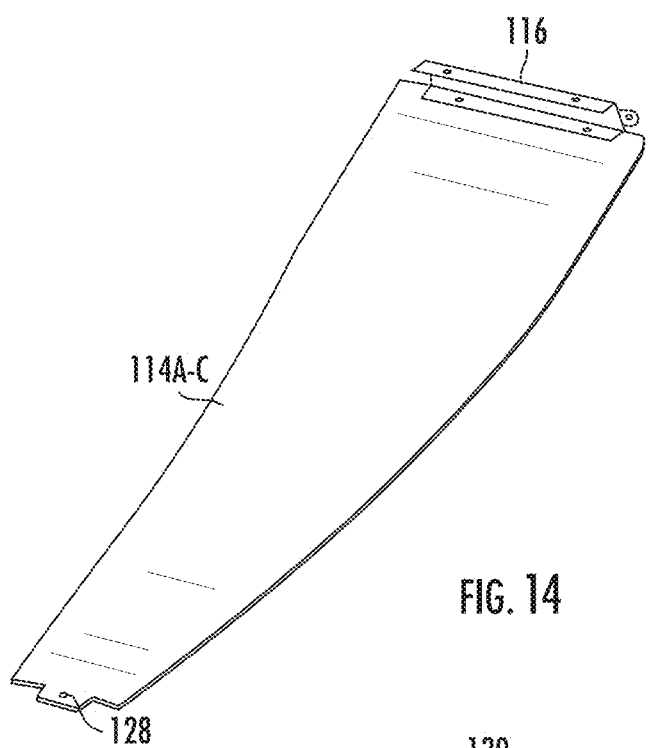
FIG. 14 is a perspective view of a panel of the modular chute system.

Referring now to FIG. 14, the plurality of panels 114A-114C may be trapezoidal shaped, and comprise UHMW as described above or other suitable materials as those of ordinary skill in the art can appreciate and described above.

Figure 15:
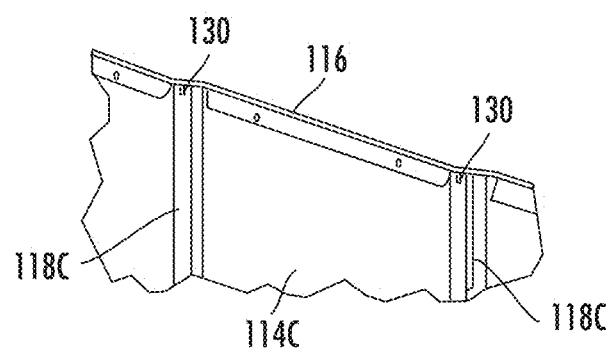
FIG. 15 is a perspective view of a mounting bracket of the panel secured to the ribs of the modular chute system.

The mounting brackets 116 of the plurality of panels 114A-114C are secured to top ends of the respective ribs using bolts 130 or other fastening devices as shown in FIG. 15.

Figure 16:
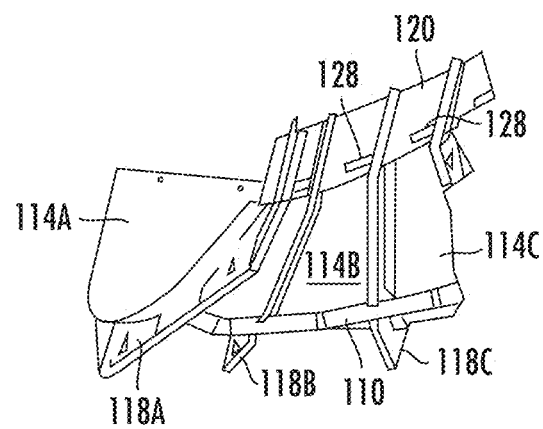
FIG. 16 is a detail view of the panel secured to the inner lining of the modular chute system.

The panels 114A-114C narrow from their proximal ends where the mounting brackets 116 are secured to the opposing distal end. The distal end of the panels may include a tab 128 that is configured to fit through the respective anchor slot 122 of inner wall 120 and be secured, as shown in FIG. 16.

A method of assembling or making the modular chute 102 includes providing the support bridge having a main body 110, and securing a plurality of mounting plates 112 along the main body 110, where the support bridge has a first end secured to an infeed component 104 and a second end secured to a discharge component 106. The method also includes securing the plurality of ribs 118A-118D to the plurality of mounting plates 112, and securing the inner lining 120 across an inner portion of the plurality of ribs 118A-118D, where the inner lining 120 has a plurality of anchor slots 122. In addition the method includes securing the proximal ends of the plurality of panels 114A-114C between an outer portion of adjacent ribs using a mounting bracket 116, and securing distal ends of the plurality of panels through the respective anchor slot 122 in the inner lining 120 to form a continuous sliding surface of the plurality of panels from the infeed component 104 to the discharge component 106.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A modular chute system comprising:
    a support bridge having a main body and a plurality of mounting plates spaced apart along the main body, the support bridge having a first end configured to be secured to an infeed component and a second end configured to be secured to a discharge component;
    a plurality of ribs each having an outer portion and an inner portion, the plurality of ribs secured to the plurality of mounting plates;
    an inner lining secured across the inner portion of the plurality of ribs, the inner lining having a plurality of anchor slots; and
    a plurality of panels each having a mounting bracket on a proximal end secured between the outer portion of adjacent ribs using the mounting bracket, and a distal end secured through a respective anchor slot to form a continuous sliding surface from the infeed component to the discharge component.

2. The modular chute system of claim 1, wherein the main body of the support bridge comprises a tube.

3. The modular chute system of claim 1, wherein the main body comprises a plurality of weldment alignment indicators along its length and correspond to locations where the plurality of mounting plates is secured to the main body.

4. The modular chute system of claim 3, wherein the plurality of mounting plates each comprise a correlating weldment alignment indicator to align with a respective weldment indicator of the main body.

5. The modular chute system of claim 1, wherein the plurality of panels comprise an inlet panel, a transition panel, and at least one common panel, with each having different dimensions.

6. The modular chute system of claim 1, wherein the plurality of ribs comprise an inlet rib, a transition rib, an outlet rib, and at least one common rib, with each having different dimensions.

7. The modular chute system of claim 1, wherein a centerline of the continuous sliding surface from the infeed component to the discharge component is curvilinear.

8. The modular chute system of claim 1, wherein the plurality of panels comprise ultra-high molecular weight polyethylene (UHMW).

9. A modular chute system comprising:
    a support bridge having a main body and a plurality of mounting plates spaced apart along the main body;

a plurality of ribs each having an outer portion and an inner portion, the plurality of ribs secured to the plurality of mounting plates;

an inner lining secured across the inner portion of the plurality of ribs, the inner lining having a plurality of anchor slots; and a plurality of panels having their proximal ends secured between the outer portion of adjacent ribs, and a distal end secured through a respective anchor slot to form a continuous sliding surface.

10. The modular chute system of claim 9, wherein the main body of the support bridge comprises a tube.

11. The modular chute system of claim 9, wherein the main body comprises a plurality of weldment alignment indicators along its length and correspond to locations where the plurality of mounting plates is secured to the main body.

12. The modular chute system of claim 11, wherein the plurality of mounting plates each comprise a correlating weldment alignment indicator to align with a respective weldment indicator of the main body.

13. The modular chute system of claim 9, wherein each of the plurality of panels comprises a trapezoidal shape.

14. The modular chute system of claim 9, wherein the distal end of each of the plurality of panels comprises a tab for securing through a respective anchor slot.

15. The modular chute system of claim 9, wherein a centerline of the continuous sliding surface from the infeed component to the discharge component is curvilinear.

16. The modular chute system of claim 9, wherein the plurality of panels comprise ultra-high molecular weight polyethylene (UHMW).

17. A method of making a modular chute comprising:

providing a support bridge having a main body;

securing a plurality of mounting plates along the main body, the support bridge having a first end secured to an infeed component and a second end secured to a discharge component;

securing a plurality of ribs to the plurality of mounting plates;

securing an inner lining across an inner portion of the plurality of ribs, the inner lining having a plurality of anchor slots; and securing proximal ends of a plurality of panels between an outer portion of adjacent ribs using a mounting bracket, and securing distal ends of the plurality of panels through a respective anchor slot in the inner lining to form a continuous sliding surface of the plurality of panels from the infeed component to the discharge component.

18. The method of claim 17, wherein the main body of the support bridge comprises a tube.

19. The method of claim 17, further comprising using a plurality of weldment alignment indicators along a length of the main body to determine the locations where to secure the plurality of mounting plates to the main body.

20. The method of claim 17, wherein the plurality of panels comprise ultra-high molecular weight polyethylene (UHMW).

\* \* \* \* \*